United States Patent
Guidash

(10) Patent No.: US 7,859,581 B2
(45) Date of Patent: Dec. 28, 2010

(54) IMAGE SENSOR WITH CHARGE BINNING AND DUAL CHANNEL READOUT

(75) Inventor: Robert M. Guidash, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1639 days.

(21) Appl. No.: 10/620,060

(22) Filed: Jul. 15, 2003

(65) Prior Publication Data
US 2005/0012836 A1    Jan. 20, 2005

(51) Int. Cl.
*H04N 3/14* (2006.01)
*H04N 5/335* (2006.01)

(52) U.S. Cl. .................................... 348/302
(58) Field of Classification Search ........... 348/302, 348/308, 310, 311, 316, 319, 272, 273, 281, 348/282, 283, 220.1, 221.1, 235, 241, 364, 348/367, 247, 230.1, 294, 304; 250/208.1
See application file for complete search history.

(56) References Cited

U.S. PATENT DOCUMENTS

| | | | | |
|---|---|---|---|---|
| 3,971,065 A | * | 7/1976 | Bayer | 348/276 |
| 4,453,177 A | * | 6/1984 | Berger et al. | 348/282 |
| 4,658,287 A | * | 4/1987 | Chen | 348/281 |
| 5,543,838 A | * | 8/1996 | Hosier et al. | 348/311 |
| 5,786,588 A | * | 7/1998 | Takahashi | 250/208.1 |
| 5,949,483 A | * | 9/1999 | Fossum et al. | 348/303 |
| 6,008,486 A | * | 12/1999 | Stam et al. | 250/208.1 |
| 6,160,580 A | * | 12/2000 | Nakashiba | 348/320 |
| 6,236,434 B1 | * | 5/2001 | Yamada | 348/315 |
| 6,452,153 B1 | * | 9/2002 | Lauxtermann et al. | 250/208.1 |
| 6,486,504 B1 | * | 11/2002 | Guidash | 257/222 |
| 6,674,094 B2 | * | 1/2004 | Sekine | 257/72 |
| 6,686,960 B2 | * | 2/2004 | Iizuka | 348/273 |
| 6,690,421 B1 | * | 2/2004 | Yamada et al. | 348/272 |
| 6,710,804 B1 | * | 3/2004 | Guidash | 348/302 |
| 6,750,912 B1 | * | 6/2004 | Tennant et al. | 348/300 |
| 6,784,928 B1 | * | 8/2004 | Sakurai et al. | 348/220.1 |
| 6,791,612 B1 | * | 9/2004 | Hwang | 348/308 |
| 6,822,213 B2 | * | 11/2004 | Stark | 250/208.1 |
| 6,867,806 B1 | * | 3/2005 | Lee et al. | 348/308 |
| 7,324,144 B1 | * | 1/2008 | Koizumi | 348/294 |
| 7,408,443 B2 | * | 8/2008 | Nam | 340/308 |
| 7,443,437 B2 | * | 10/2008 | Altice et al. | 348/296 |

(Continued)

FOREIGN PATENT DOCUMENTS

EP      0 757 476 A2     2/1997

(Continued)

*Primary Examiner*—Lin Ye
*Assistant Examiner*—Chriss S Yoder, III
(74) *Attorney, Agent, or Firm*—Peyton C. Watkins; Nancy R. Simon

(57) ABSTRACT

An image sensor includes: (a) a plurality of light measuring elements arranged in an array and at least a portion of the elements have a color filter mated with the light receiving elements which permits selective color reception by the light measuring elements; (b) a plurality of floating diffusions respectively mated with the plurality of light receiving elements; and c) an output structure electrically connected to two or more of the floating diffusions; wherein the at least two light receiving elements receiving the same color are transferred to the output structure substantially simultaneously.

24 Claims, 20 Drawing Sheets

U.S. PATENT DOCUMENTS

| | | | |
|---|---|---|---|
| 2002/0018131 A1* | 2/2002 | Kochi | 348/304 |
| 2002/0154231 A1* | 10/2002 | Decker et al. | 348/302 |
| 2003/0117520 A1* | 6/2003 | Fossum et al. | 348/364 |
| 2004/0041927 A1* | 3/2004 | Cho et al. | 348/254 |
| 2004/0041931 A1* | 3/2004 | Tu et al. | 348/300 |
| 2005/0018064 A1* | 1/2005 | Itoh et al. | 348/308 |
| 2006/0208163 A1* | 9/2006 | Manabe et al. | 250/208.1 |
| 2007/0075221 A1* | 4/2007 | Park | 250/214.1 |

FOREIGN PATENT DOCUMENTS

| | | |
|---|---|---|
| EP | 0 926 901 A2 | 6/1999 |
| EP | 0 954 032 A2 | 11/1999 |
| EP | 0 967 795 A2 | 12/1999 |
| WO | WO 00/57634 | 9/2000 |

* cited by examiner

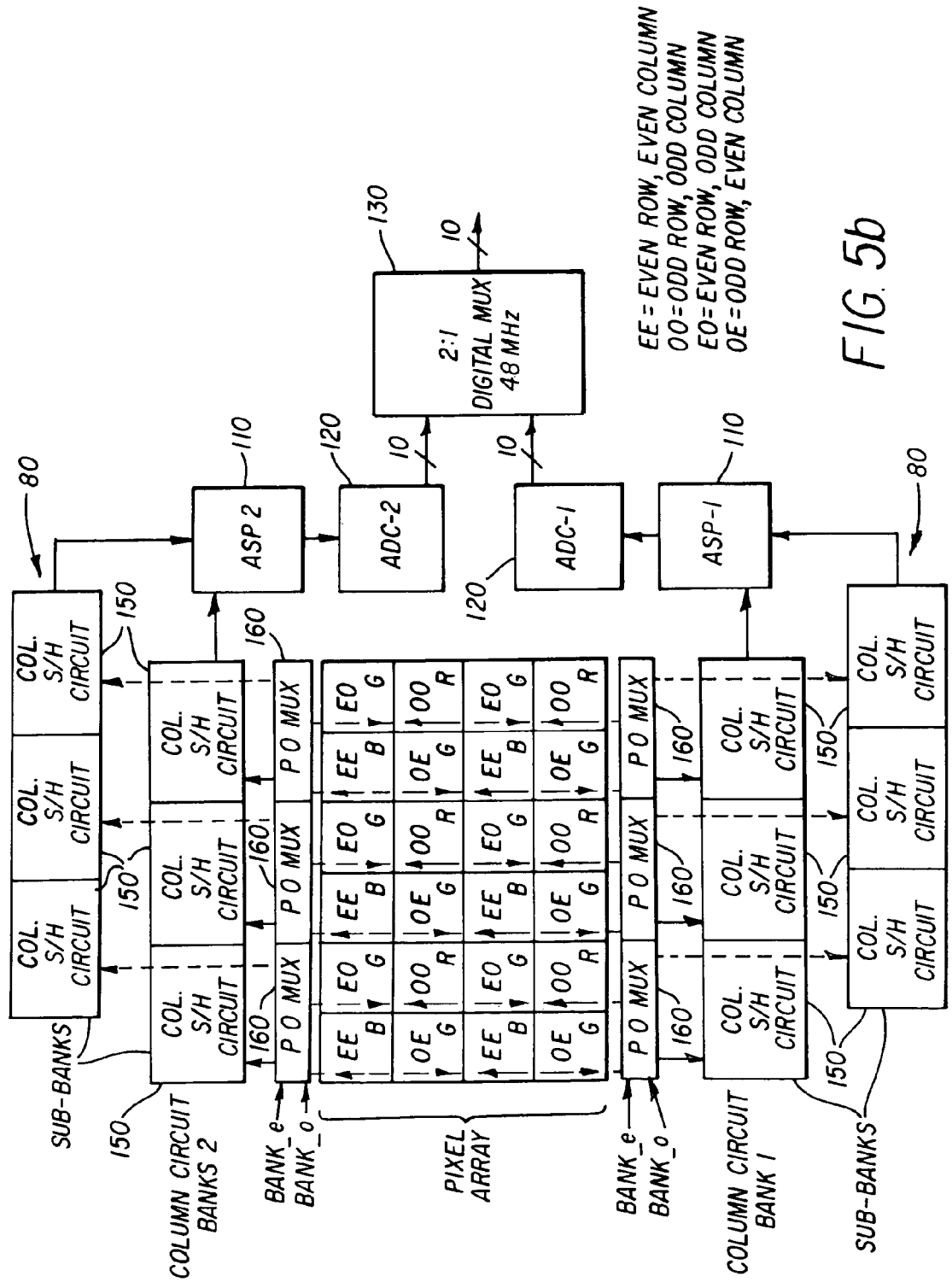

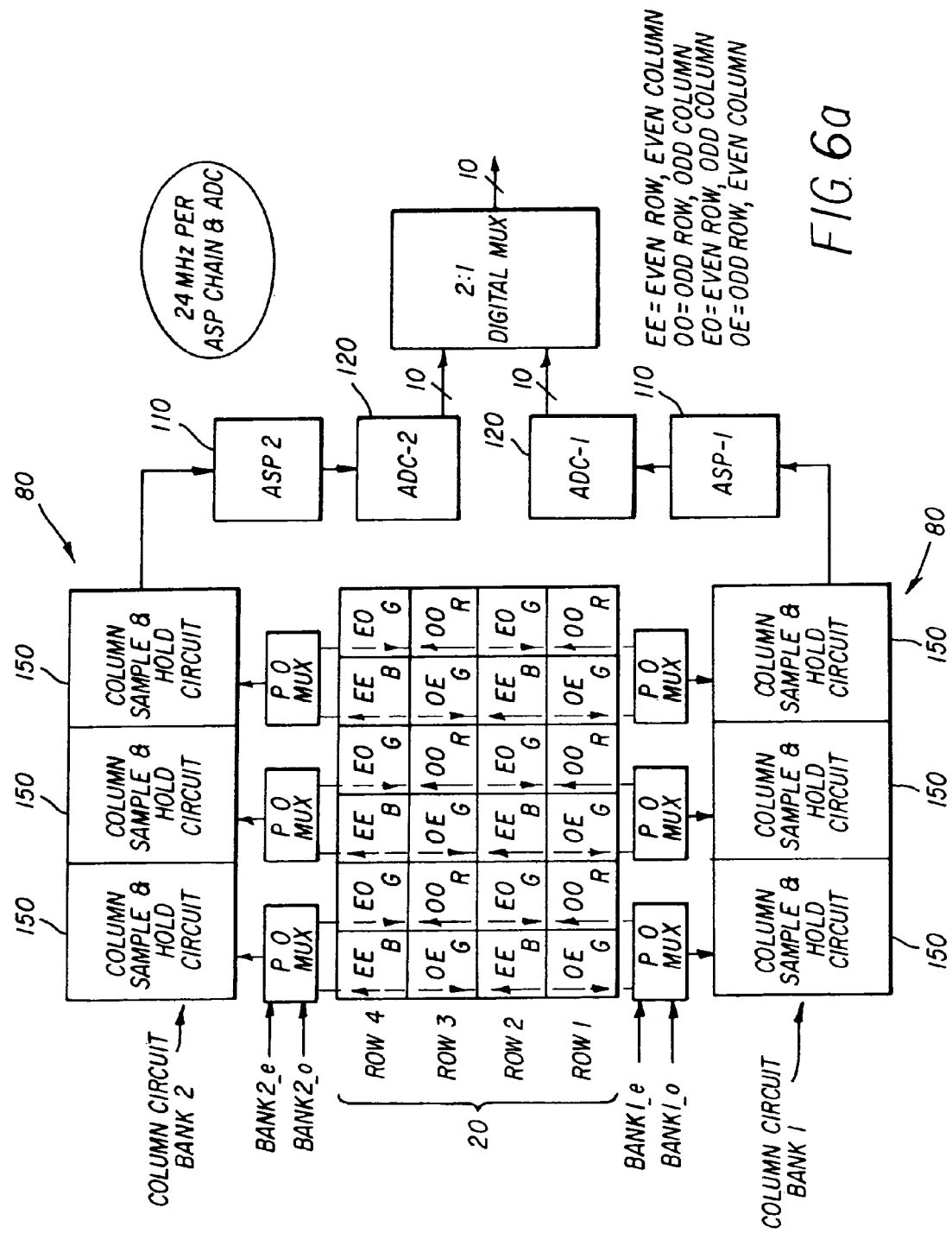

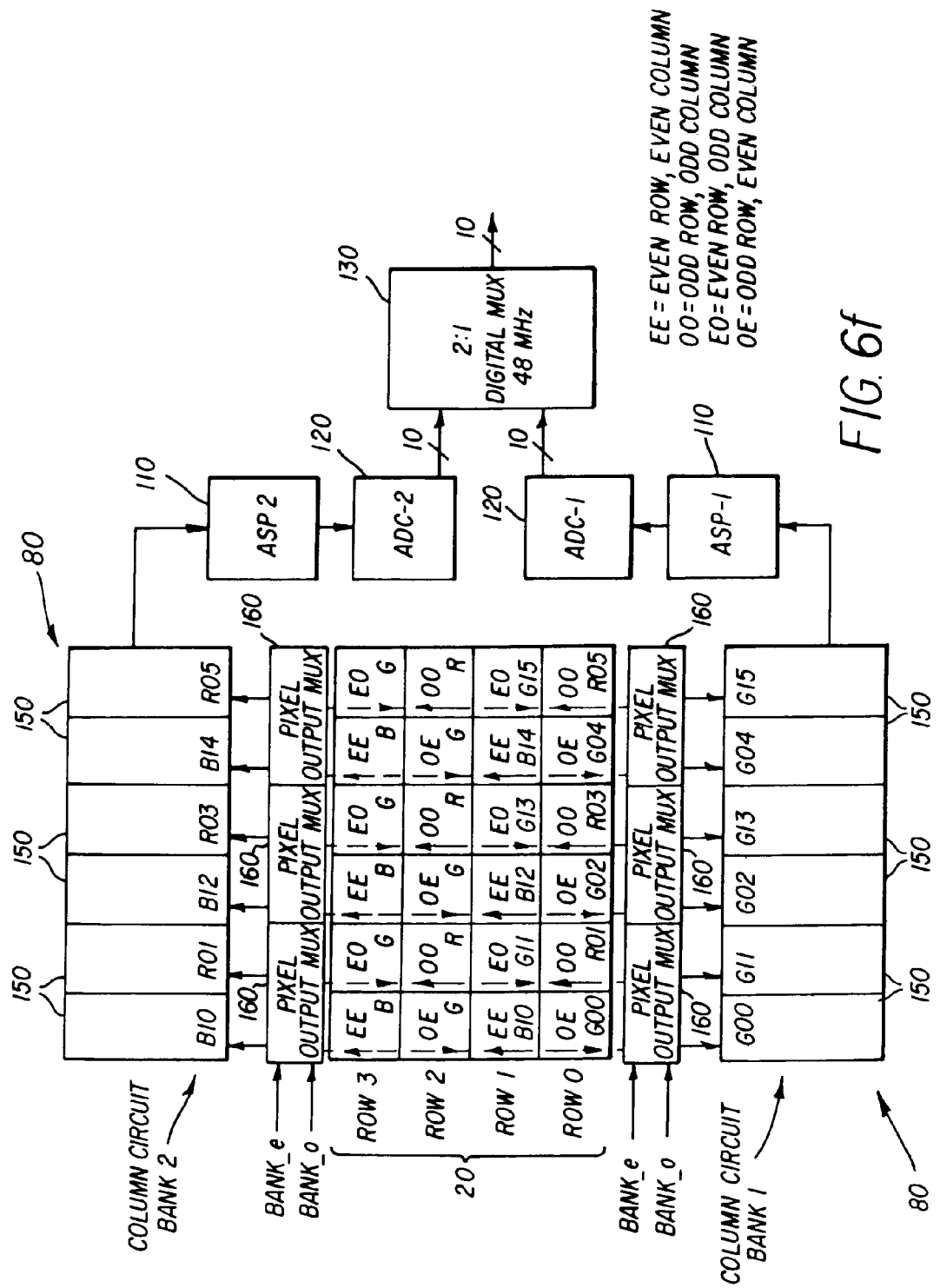

IMAGE SENSOR WITH CHARGE BINNING AND DUAL CHANNEL READOUT

FIELD OF THE INVENTION

The present invention pertains to semiconductor based image sensors such as Active Pixel image sensors (APS), and Passive Pixel image sensors (PPS), and more particularly, to such APS and PPS with charge binning, high sensitivity, low noise, and parallel channel readout.

BACKGROUND OF THE INVENTION

APS and PPS are x-y addressable solid state imagers wherein each pixel contains both a photosensing element and a select element. For APS, each pixel also contains at least one other active circuit component. In both APS and PPS, incident illumination is converted to a signal (either a voltage or current signal). The signal represents the amount of light incident upon a pixel photosite. This signal is typically readout one row at time, and the signals for a given row are stored temporarily in a circuit associated with each column of the image sensor. This column circuit is typically constructed to fit into the size or pitch of the pixel.

For many digital imaging applications, it is desirable to have a large number of pixels in a given size image sensor in order to increase the resolution of the image sensor. As the resolution requirement increases, the required pixel size decreases. As the pixel size decreases, several image sensor design and performance disadvantages are encountered. First, it becomes increasingly more difficult to construct a low noise column storage and readout circuit. Second, smaller pixels have lower sensitivity and can provide inadequate signal levels for low levels of illumination. Third, for a large number of pixels, the readout time will become longer. In many cases, a camera is required to produce video as well as still images.

Typically the video rate desired is 30 frames per second. Prior art APS and PPS sensors have accomplished video rate data from large resolution sensors by windowing or sub-sampling of the image array using the x-y addressability feature of APS and PPS sensors. While this approach provides video rate data, it does so by selective readout of the small pixels and still has poor image quality in low light level environments, and produces aliasing image artifacts.

Some APS and PPS sensors also include on sensor white balance by placing a programmable gain amplifier PGA in the readout path, which gain can change at a pixel data rate. For high resolution sensors, this has the disadvantage of requiring higher performance PGAs.

From the foregoing discussion it should be apparent that there remains a need within the prior art for a high resolution, small pixel device that provides high readout rate, variable resolution while retaining low noise and high sensitivity.

SUMMARY OF THE INVENTION

According to the present invention, there is provided a solution to problems of the prior art. In the present invention, an APS device with a selectable channel readout architecture is provided that enables small pixels and high resolution sensors, low noise column storage and readout circuitry, and adjacent same color sample averaging for high performance lower resolution readout.

According to another embodiment of the present invention, the selectable channel readout architecture is employed with a shared amplifier pixel to provide selectable charge domain binning to further improve sensitivity and low light signal to noise performance.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The invention has the following advantages. It provides for low noise, high sensitivity multiple resolution imaging from a single image sensor.

BRIEF DESCRIPTION OF THE DRAWINGS

FIG. 3b is a timing diagram of FIG. 3a;

FIG. 5b is an alternative embodiment of FIG. 5a with column banks at twice the pixel pitch;

FIG. 6a is a block diagram for operation of the sensor shown in FIG. 2;

FIG. 6b first timing diagram of FIG. 6a;

FIG. 6e is an operational block diagram for adjacent sample averaging operation of the sensor shown in FIG. 5a;

FIG. 6f is a second operational block diagram for two row readout operation of the sensor shown in FIG. 5a;

DETAILED DESCRIPTION OF THE INVENTION

The examples and diagrams provided in the description of the present invention represent one preferred embodiment of the present invention. Numerous other specific embodiments are feasible without departing from the scope of the present invention.

Figure 1:
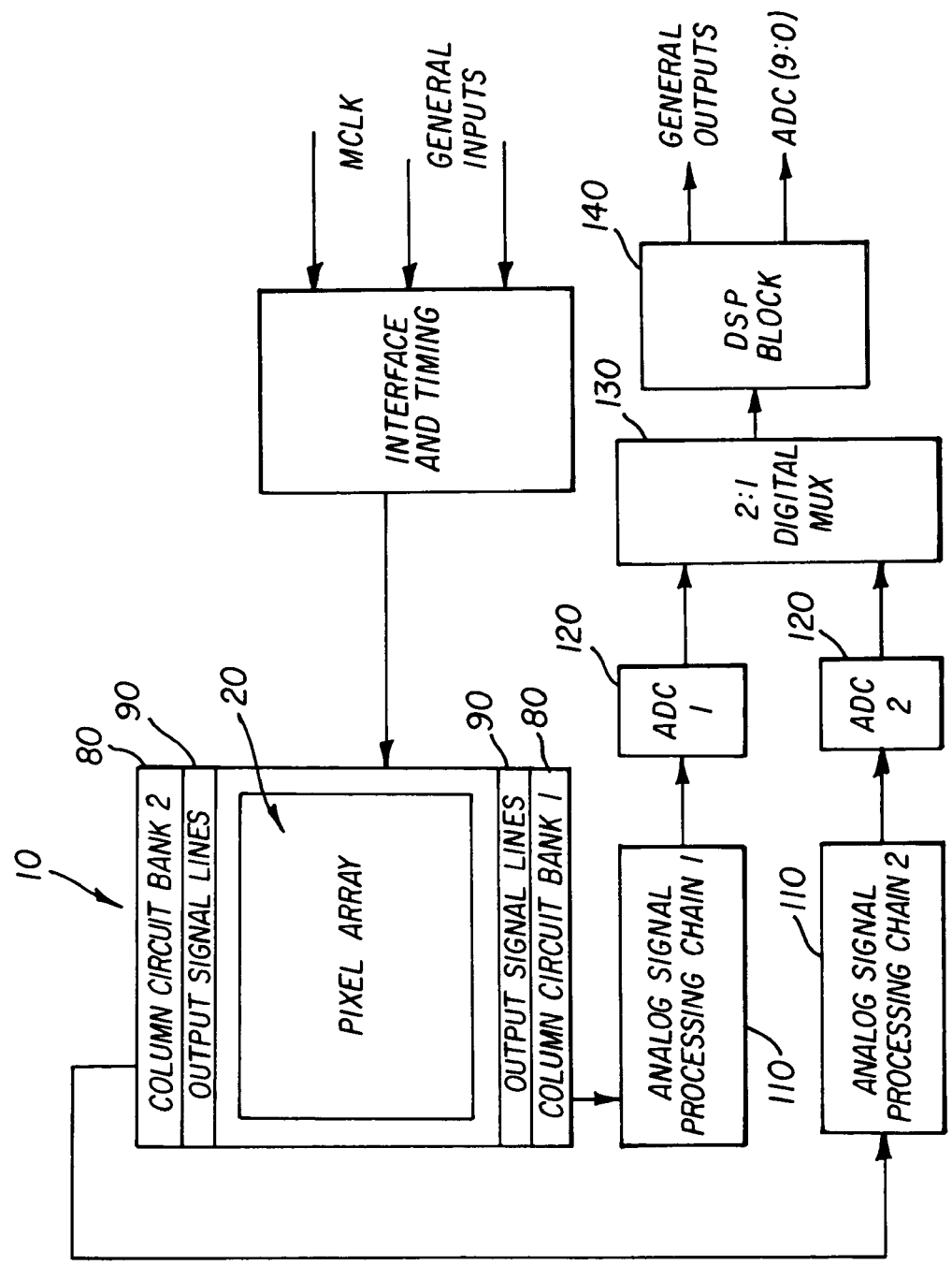
FIG. 1 is a block diagram for the sensor of a first embodiment of the present invention.

Referring to FIG. 1, there is shown a top level block diagram of the image sensor 10 of the present invention. The sensor array comprises a plurality of pixels 20. The pixels 20 can be any known APS or PPS x-y addressable pixel design.

Two column circuit banks 80 (also referred to as storage regions), each comprising a plurality of column sample and hold circuits (not shown in FIG. 1) are electrically connected to the output signal lines 90 of the sensor array 10. Two parallel analog signal processing (ASP) chains 110 (also referred to as readout regions) are respectively connected to each column circuit bank 80. An analog to digital converter (ADC) 120 is electrically connected to each processing chain 110 for digitizing the signal. A 2:1 digital multiplexer 130 is connected to both analog to digital converters 120 for selectively selecting the output from the two analog to digital converters 120. A digital signal processing (DSP) block 140 receives the signal from the multiplexer for further processing the signal. An interface is provided to operate and program various modes and specific parameters for the sensor.

Figure 2:
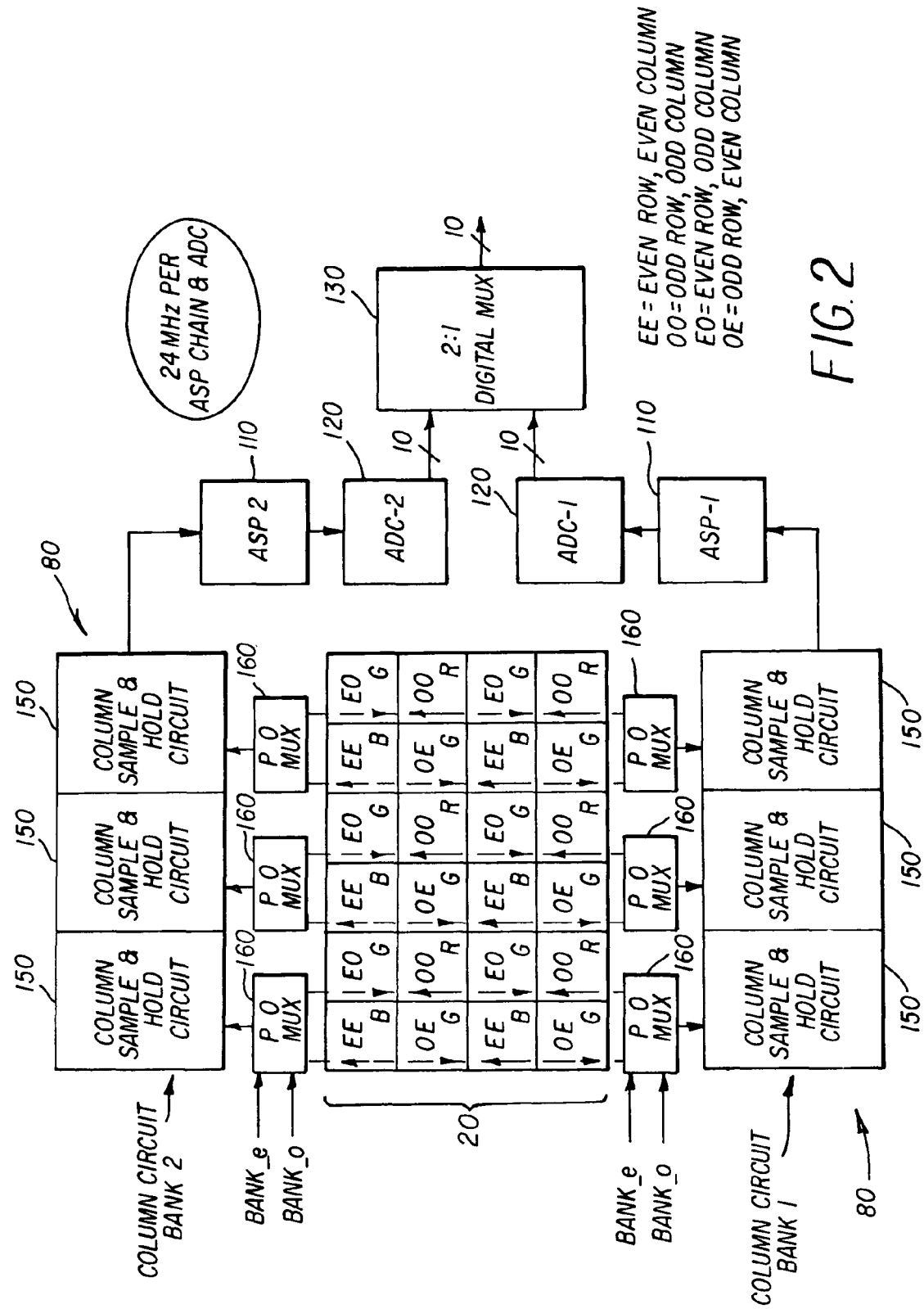
FIG. 2 is an architecture diagram for the sensor of a first embodiment of the present invention.

Referring to FIG. 2, there is shown a block diagram of a plurality of pixels 20 arranged in rows and columns, mated to a color filter (indicated by the letters R, G, B) for permitting each pixel to selectively receive light of a specific color determined by the bandpass of the color filter. In this figure the color filter pattern is a Bayer pattern, of red (R), green (G) and blue (B) bandpass filters. The R, G and B letters in each pixel denote the color filter associated with that pixel. In addition the letters E and O in each pixel denote the row and column identification as Even and Odd. For example the letters EO denote a pixel is in an even row and an odd column. For ease of detailed viewing, the diagram shows four rows and six columns, which are only a section of the imaging array and associated circuits. Two column circuit banks 80 include a plurality of column sample and hold circuits 150, which are electrically connected to the columns of pixels. More specifically, each bank comprises three column sample and hold circuits 150 that are each electrically connected to two columns of pixels 20 via a two-to-one pixel output analog multiplexer 160 that enables sample and hold of the signals from either of the two columns of pixels into either of the associated column circuits. As previously shown in FIG. 1, each column bank 80 is connected to an associated ASP chain 110 and ADC 120. In this example, the column sample and hold circuits 150 are constructed at twice the pixel pitch. This provides the advantage of being able to realize a low noise column sample and hold circuit for small pixels. The fixed pattern noise is improved by having more space for signal isolation and layout matching. Temporal noise of the column sample and hold circuit 150 can be reduced by using larger capacitors and switches. The physical floor plan could be implemented with one bank at the top of the array and one bank on the bottom of the array, or both banks could also be stacked on a single side of the array.

As stated previously, one disadvantage with the prior art two channel architecture is offset and gain matching between the two channels. This will lead to green non-uniformity (GNU) artifacts.

Figure 6B:
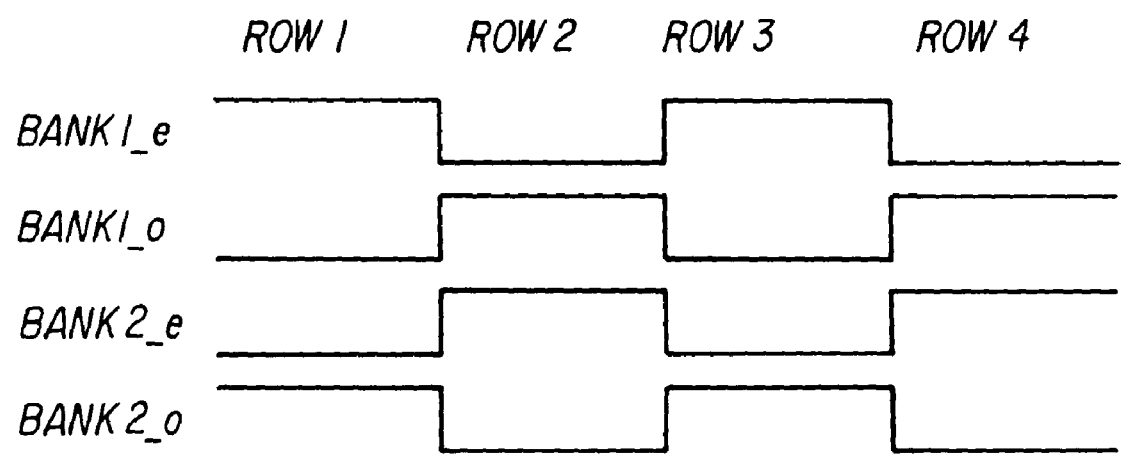

Still referring to the architecture in FIG. 2, the dashed lines with arrows within each column indicate which direction or bank of column circuits that the specific pixel is sampled and held in for a first preferred embodiment of the present invention. In this first configuration, all pixels of a particular color in a row are sent to a common column circuit bank. For example, all red pixels in odd rows are sent to column circuit bank 2, and all green pixels in odd rows are sent to column circuit bank 1. In even rows, all blue pixels are sent to column circuit bank 2 and all green pixels are sent to column circuit bank 1. In this manner, the green color plane would go through a single ASP chain 110 and ADC 120, while red and blue would go through the other ASP chain 110 and ADC 120. As a result, no offset or gain mismatch would occur between green pixels in the green-red row (Gr), and green pixels in the green-blue row (Gb). This is accomplished by timing of the pixel output multiplexer 160. This specific timing for this example is shown in FIGS. 6a and 6b. The signals Bank1_e and Bank1_o determine if the even and odd pixels respectively in a given row are sent to column circuit bank 1. Bank1_e and Bank2_o serve the same purpose for column circuit bank 2. For odd rows, Bank1_e is high, Bank1_o is low, Bank2_e is low and Bank2_o is high. For even rows, Bank1_e is low, Bank1_o is high, Bank2_e is high and Bank2_o is low. This color plane separation approach enabled by the present invention can mitigate the GNU issue. In general, the timing of the pixel output multiplexers can be used to send any pixel to either or both of the associated column sample and hold circuits.

Because of the color plane separation afforded by the selectable dual channel architecture, it is now possible to average like color signals in a pipelined manner because each column circuit bank and ASP chain contains samples of the same color for any given row. Also, by operating in this manner, a pixel rate White Balance (WB) Programmable Gain Amplifier (PGA) is not needed since for any given row, each ASP chain 110 contains signals from a single color plane. In this case the WB PGA must change at a line rate and alternate between Gr and Gb for ASP chain 1, and R and B for ASP chain 2. ASP chain 1 and chain 2 are identical, and operate at one half the final pixel output data rate.

In another configuration of this same architecture, a color difference readout can be provided. The color difference readout operation will be described using the four transistor active pixel shown in FIG. 4, although the other pixel architectures can be used without departing from the scope of the invention. Referring to the sensor block diagram and timing diagram in FIGS. 3a and 3b, color difference readout is accomplished in the following manner. Referring to both FIGS. 3a, 3b, and 4, after integration is completed, readout of the row 1 commences after reset of the floating diffusions 190 of the pixels in that row, (a green-red row in this example). The reset level of the floating diffusion 190 in the green pixel is then stored as the reference level in one column circuit bank 80. This is referred to as Resetg. Next the signal in the photodiode 170 is transferred to the floating diffusion 190 for all pixels in the row. The signal level on the floating diffusion 190 in the red pixels is now stored as the reference level in the second column circuit bank 80. This voltage level stored is R+Resetr. Next the signal level of the floating diffusion 190 in the green pixel is stored as the signal level in both column circuit banks. This is G+Resetg. Readout of the stored signal now commences. One column bank 80 produces a true correlated double sample readout of the green signal level as shown in equation 1.

$$(Green+Resetg-Resetg)=G \tag{1}$$

The other column circuit bank provides a color difference signal readout as shown in equation 2.

$$(Green+resetg)-(Red+resetr)=(G-R)+(Resetg-Resetr) \tag{2}$$

This process repeats for all rows in the sensor.

Figure 6C:
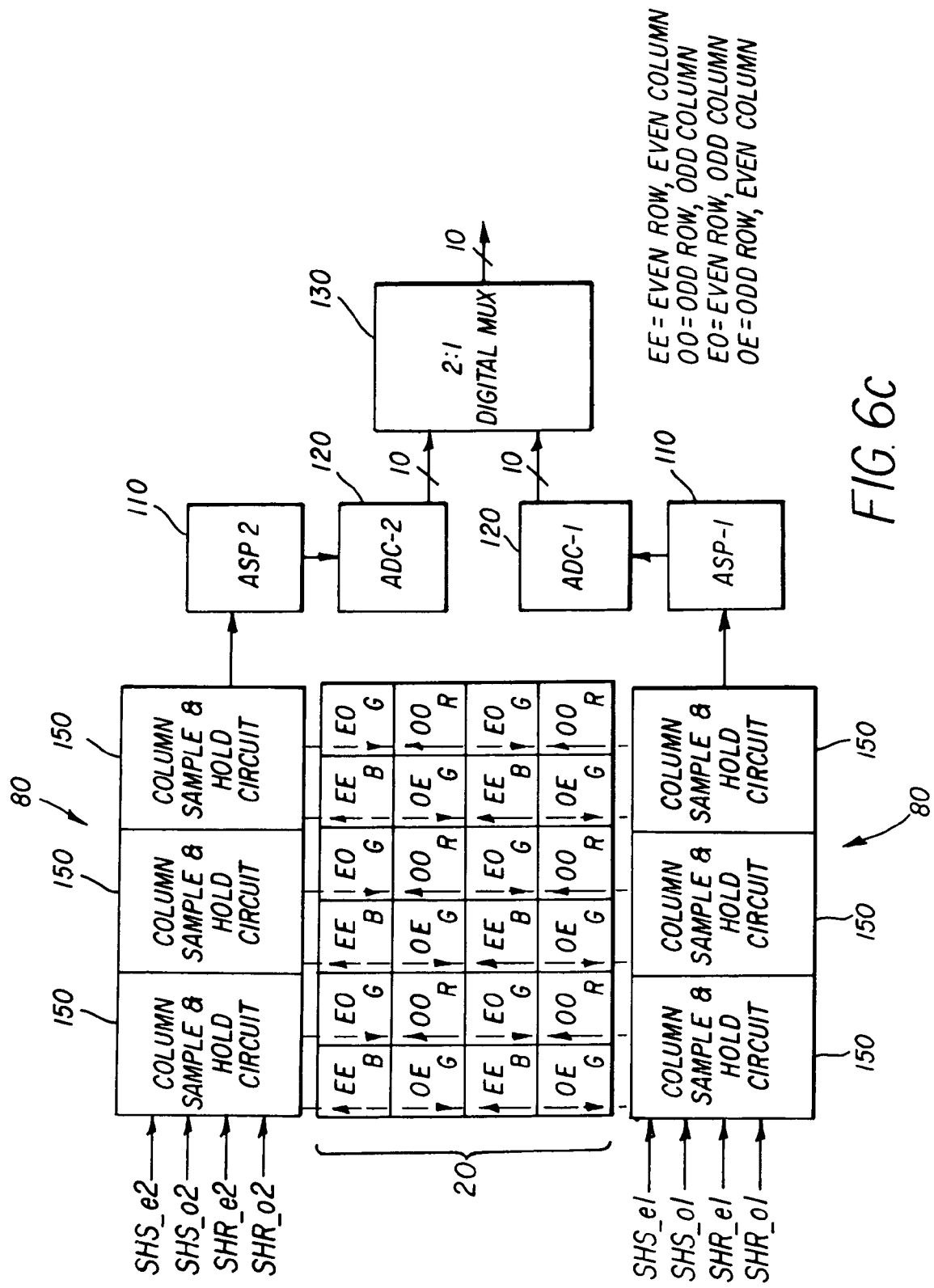
FIG. 6c is a block diagram for operation of a second embodiment of the present invention.
Figure 6D:
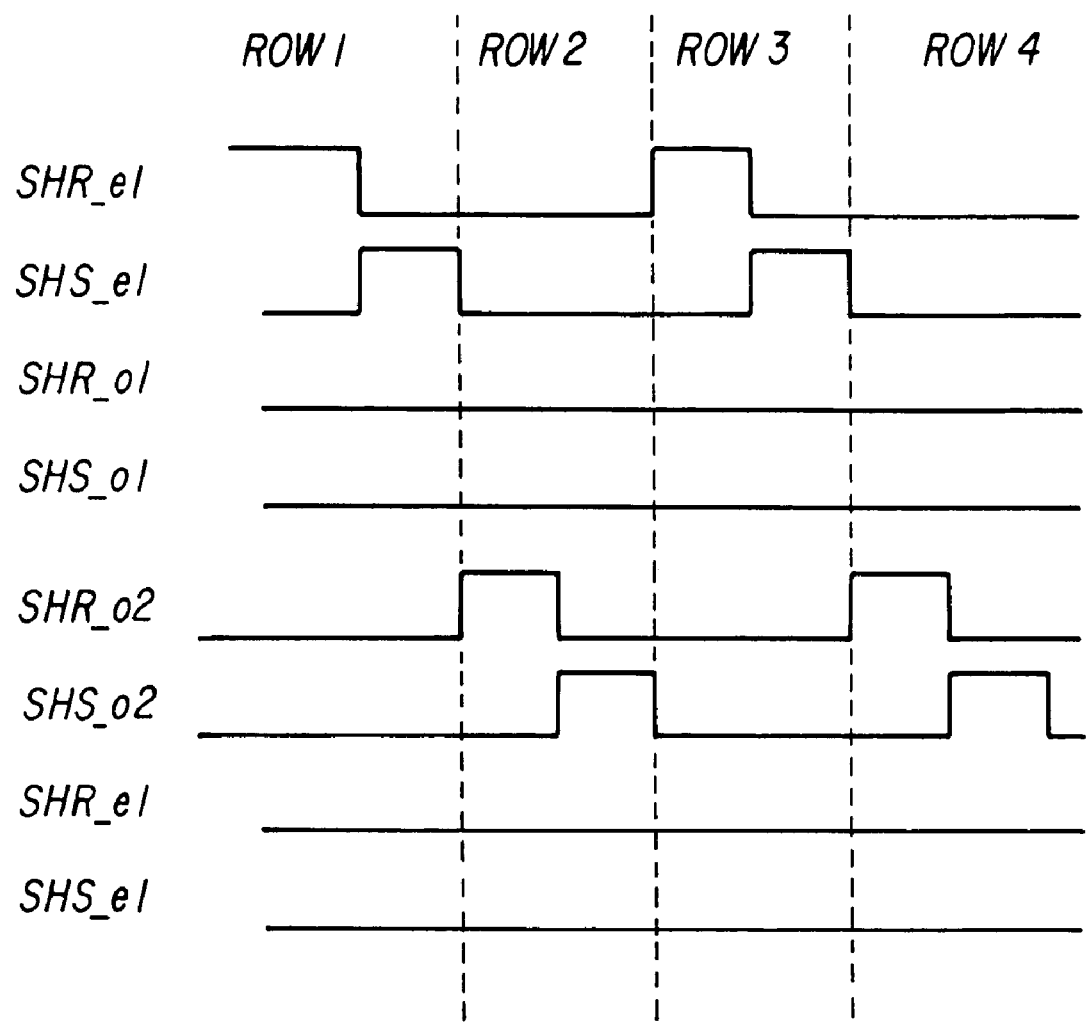
FIG. 6d is a timing diagram of FIG. 6c.

Another embodiment of the selectable dual channel sensor architecture of the present invention is shown in FIGS. 6c and 6d. The analog multiplexers (160 in the previous Figures) are eliminated and separate control of sample and hold signals for each bank are provided. These signals are labeled SHS_e and SHS_o for sample and hold signal even and odd respectively, and SHR_e and SHR_o for sample and hold reference even and odd respectively. These are provided separately for column circuit banks 1 and 2 (80) and denoted in FIGS. 6c and 6d accordingly. The analogous timing for FIGS. 6a and 6b with this architecture is shown in FIGS. 6c and 6d. In general the timing of the bank sample and hold signals can be used to send any pixel to either or both of the associated column sample and hold circuits 150.

Figure 5A:
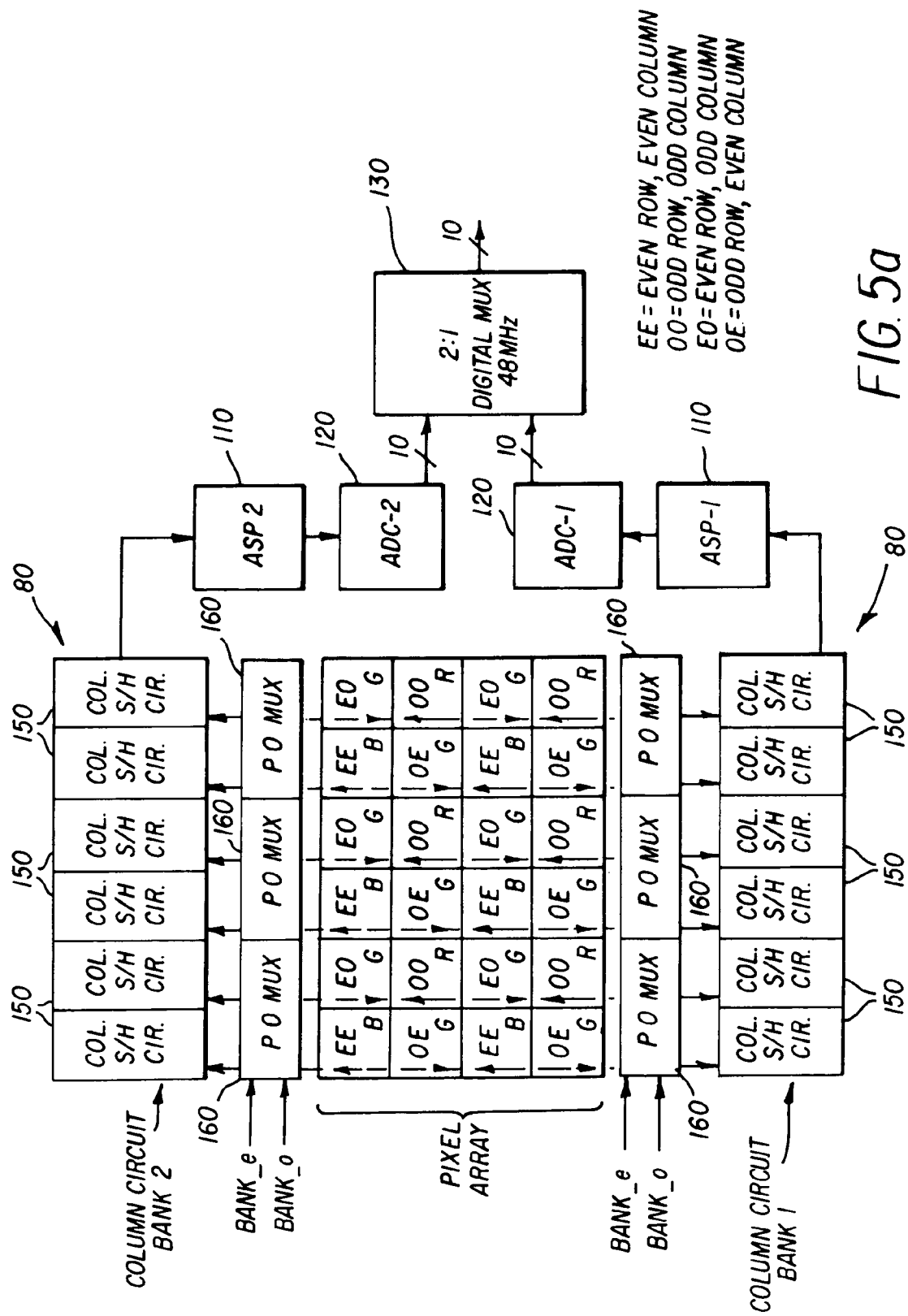
FIG. 5a is a block diagram for the sensor of a third embodiment of the present invention.

An alternate sensor architecture is shown in FIGS. 5a and 5b. In the case of FIG. 5a, there are two banks of column sample and hold circuits 80, but the column sample and hold circuits 150 are constructed at the pixel pitch. The pixel output multiplexer 160 is now a 2:2 configuration where the odd and even pixel in a given row can be sent to one of two, or both column sample and hold circuits 150 associated with that multiplexer 160. Details of multiplexer 160 are not shown and can be any configuration known in the art. FIG. 5b is electrically equivalent to FIG. 5a, except that the column banks 80 are split into two sub-banks 150 that are constructed at twice the pixel pitch. This stacked or staggered approach shown in FIG. 5b retains the advantages of a wider column circuit as described for the architecture of FIG. 2.

Figure 3A:
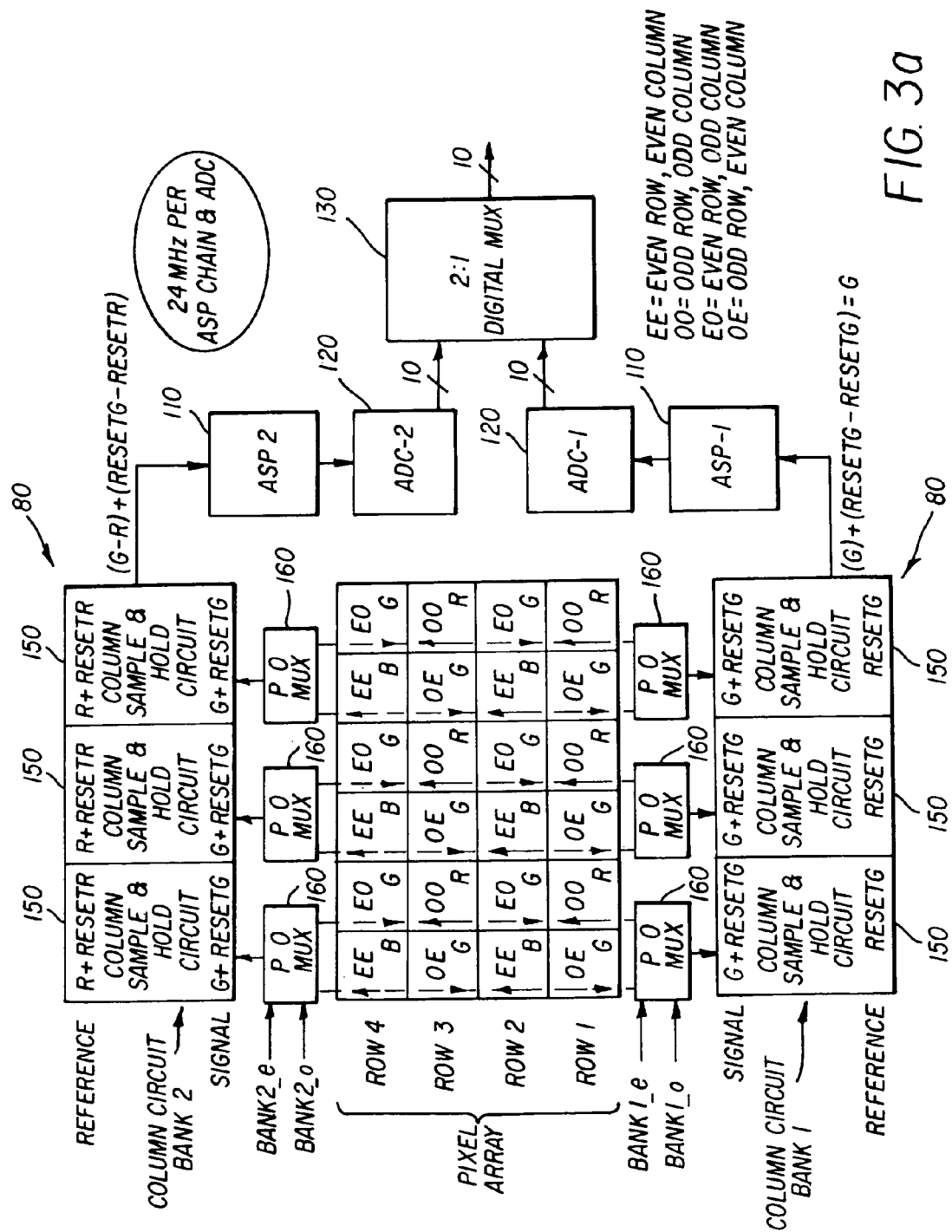
FIG. 3a is a block diagram for color difference readout.
Figure 3B:
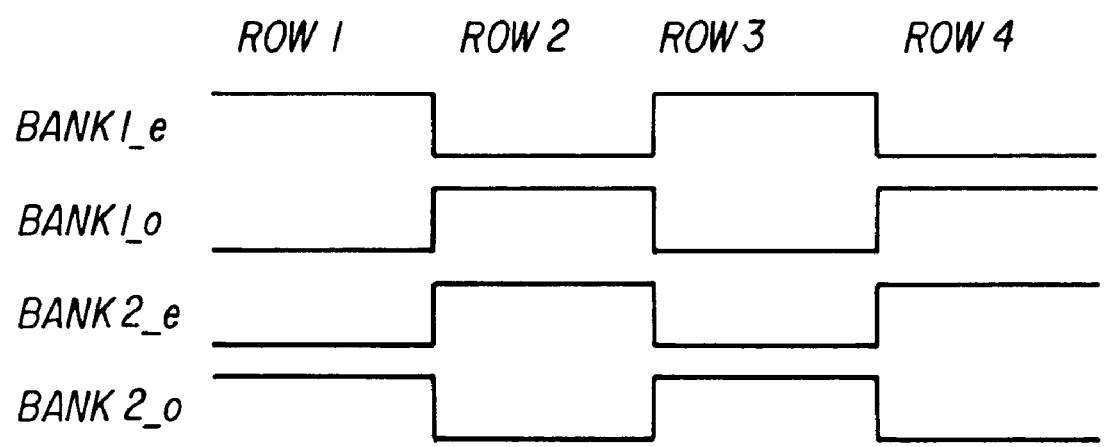
Figure 4:
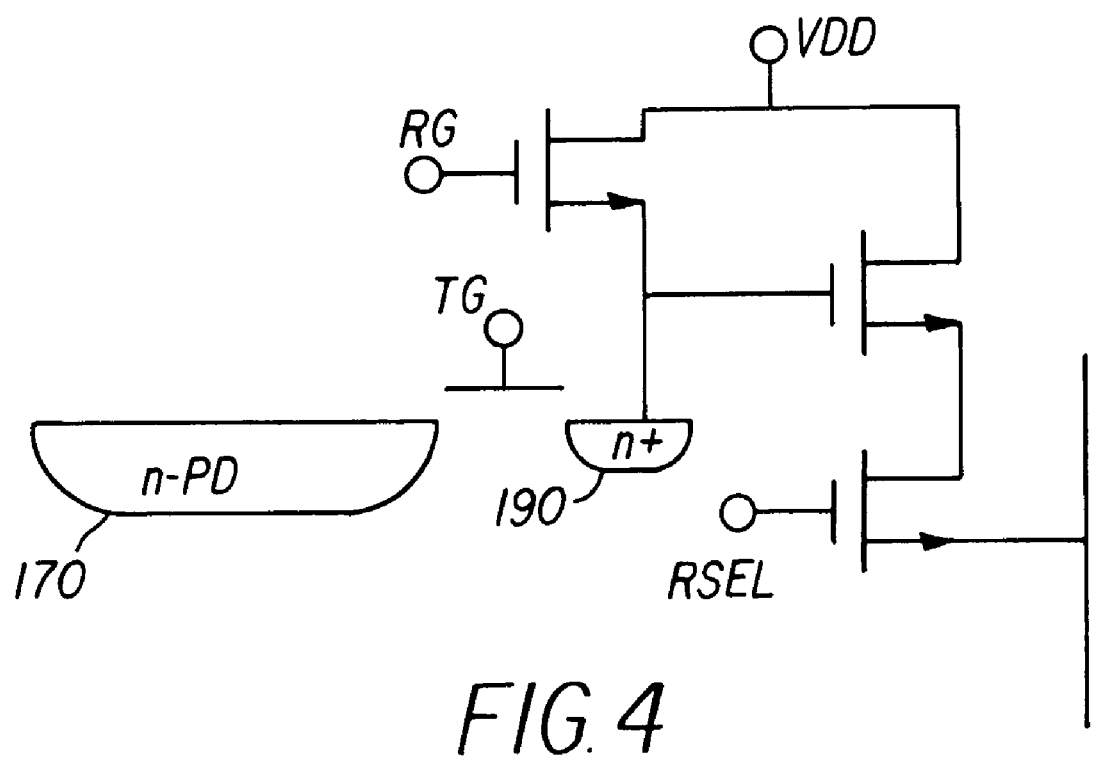
FIG. 4 is a schematic diagram of a four transistor active pixel.
Figure 6E:
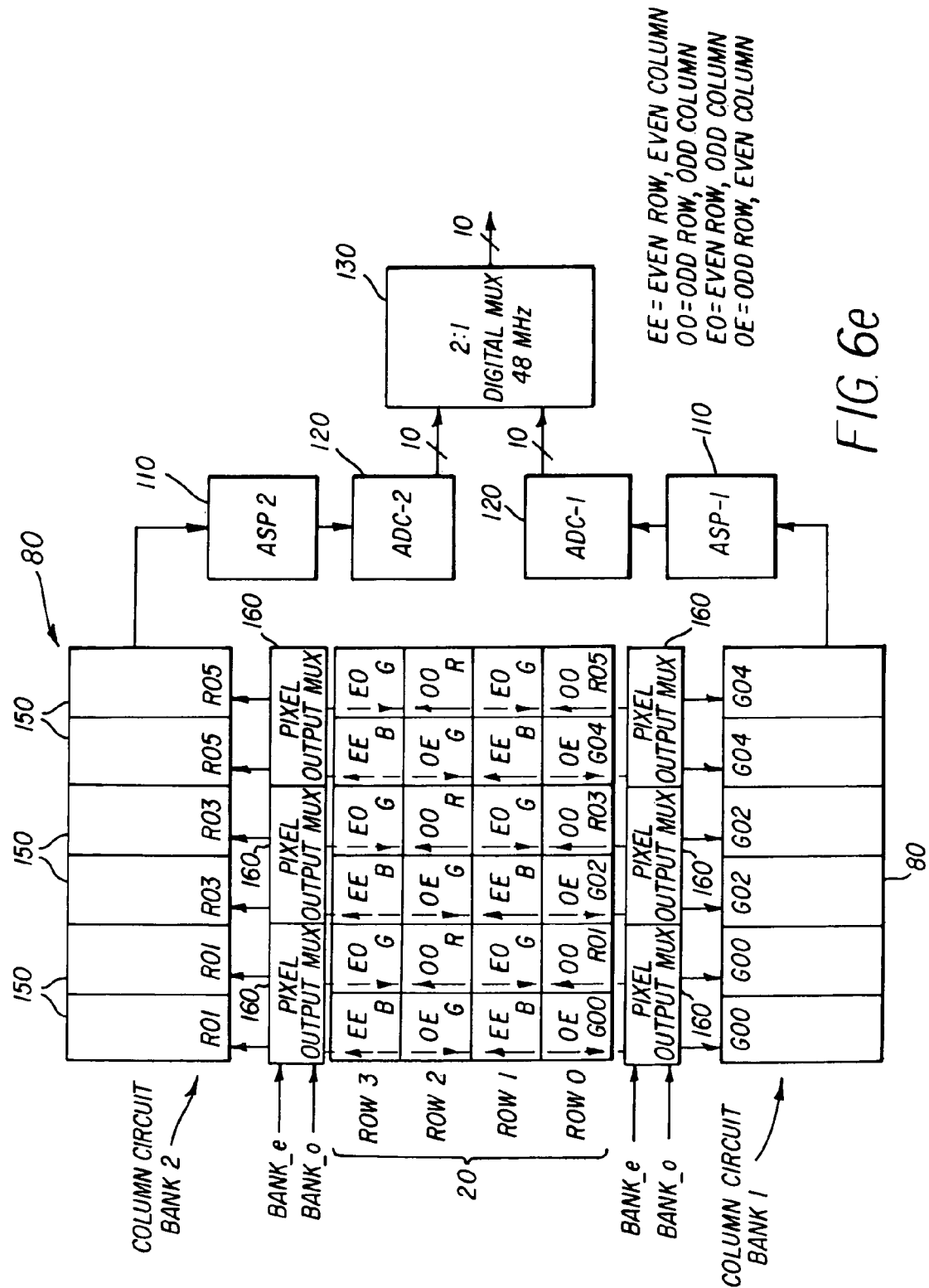

The same color plane separation can be accomplished with the two channel sensor architectures of FIGS. 5a and 5b in a similar manner as described for the sensor architecture of FIGS. 2, 3a, and 3b. The sensor architectures of FIGS. 5a and 5b provide an additional capability over that already described. Because the column sample and hold circuits 150 are built at the pixel pitch, the two channel architecture can effectively store and readout two samples of each pixel in a single row of image data simultaneously. By timing the pixel output multiplexer 160, two samples of the pixel value in each row of sensor data can be stored with the color planes separated for efficient adjacent sample averaging. This is shown in FIG. 6e. Again the operation is described in the context of the pixel shown in FIG. 4 in a rolling shutter mode. Other pixel architectures and modes of operations can be used without departing from the scope of the invention. After integration ends, sample and hold of row 0, an odd row, commences. Each Gr pixel signal level is stored in two adjacent column locations of column circuit bank 1 (80) by using the pixel output multiplexer 160 to connect the Gr pixel output to both of the associated column sample and hold circuits 150 in bank 1 (80). Each of the G pixels stored in the respective column sample and hold circuit is labeled as G0X, where 0 denotes row zero and X denotes the column number in that row. As shown in FIG. 6e each G pixel in the row gets stored in two adjacent column locations in column circuit bank 1 (80). Similarly each of the R signal values in row 0 is sampled and held in two adjacent column sample and hold circuits 150 in bank 2 (80). Now the two banks (80) can be read out in parallel and the two adjacent stored signals from a single pixel can be averaged to create a lower noise value. The average is most easily accomplished in the digital domain after analog to digital conversion. The process is repeated for the next row, an even row, where two samples of Gb are stored in bank 1 (80), and two adjacent samples for each B are stored in bank 2 (80). In general, this approach can be employed with n-sample and holds connected to a single pixel to provide n-sample averaging.

The same color plane separation afforded by the two channel sensor architecture of FIGS. 2, 6c, and 6d can also be accomplished with the two channel sensor architecture of FIGS. 5a and 5b by storage and readout of two rows in parallel. Referring to FIG. 6f, after integration ends sample and hold of row 0, an odd row, commences. Each Gr pixel signal level is stored in even column locations of column circuit bank 1 (80) by using the pixel output multiplexer 160 to connect the Gr pixel output to the even column locations of the associated column sample and hold circuits 150 in bank 1 (80). Similarly each of the R pixel signal values is sampled and held in the odd column sample and hold circuits 150 in bank 2 (80). Next row 1, an even row is sampled and held. Each Gb pixel signal level is stored in odd column locations of column circuit bank 1 (80) by using the pixel output multiplexer 160 to connect the Gb pixel output to odd column locations of the associated column sample and hold circuits 150 in bank 1 (80). Similarly each of the B pixel signal values is sampled and held in the even column sample and hold circuits 150 in bank 2 (80). Now the two banks (80) can be read out in parallel. This is shown in FIG. 6f by placement of specific R, G and B pixels in the column circuits with a value of Cxy, where C denotes the color, x denotes the row and y denotes the column. For example B10 is the blue pixel in row 1 and column 0. This process is repeated for each group of two rows in the array. By storage and readout in this manner, a 2×2 region of the array is always available in the digital domain and this can be utilized for on-chip pipelined color processing.

It should be noted that any pixel architecture can be used in conjunction with this selectable two channel storage and readout architectures described in the present invention without departing from the scope of the invention. Further the dual channel concept can be extended to multiple channels with the ability to store and readout any pixel in any bank.

Further advantages of the selectable multi-channel sensor architecture can be realized by use of a specific pixel architecture. A shared amplifier pixel can be employed with the selectable two-channel sensor architecture, to enable charge domain binning and adjacent sample averaging to provide higher sensitivity and lower noise for cases where lower resolution still images or low light, lower resolution video is desired. One example of an envisioned embodiment of the shared pixel architecture is shown in FIG. 7.

Figure 7:
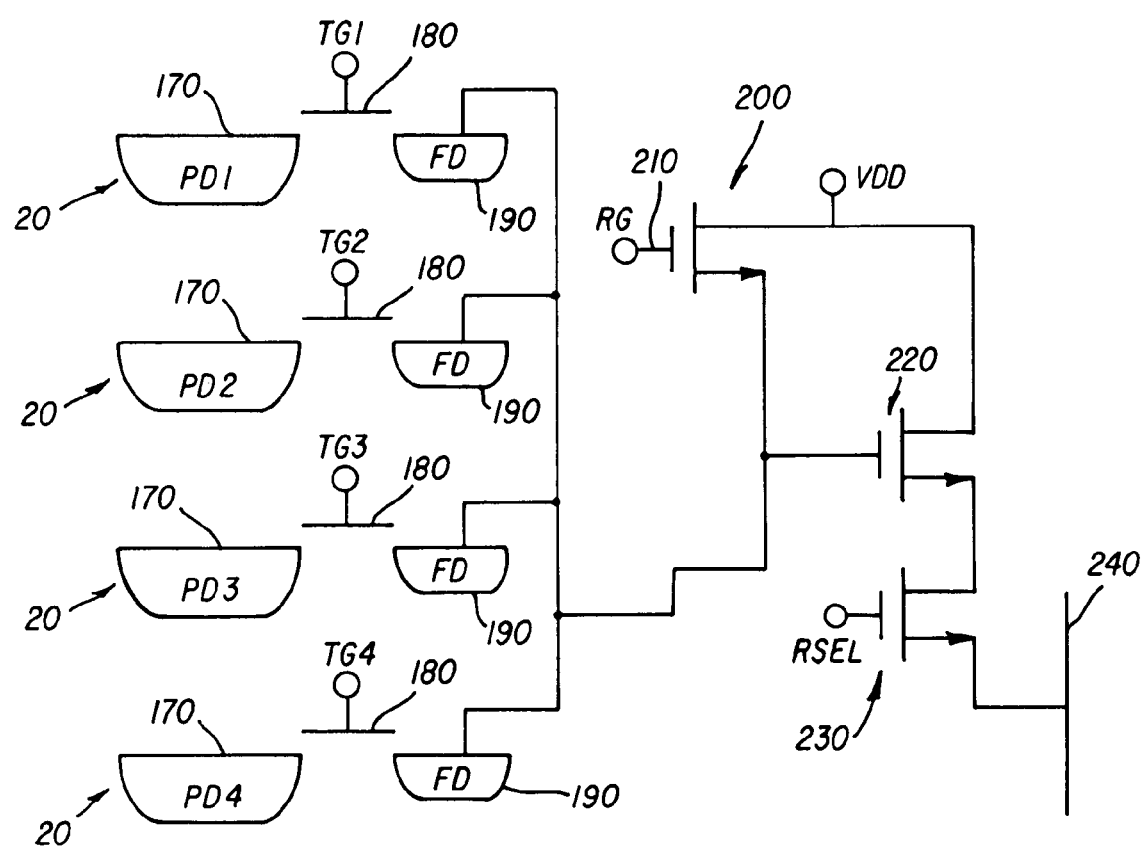
FIG. 7 is a schematic diagram of a pixel architecture of the present invention.

Referring to FIG. 7, there is shown a schematic drawing of a shared amplifier pixel of the present invention. This pixel architecture enables charge domain binning of the same color pixels, as well as charge domain binning of all pixels that share the same amplifier. Although this pixel is used as a preferred embodiment of the present invention, other pixel architectures can be employed for both charge domain binning, and for use in the selectable dual channel storage and readout architecture. Four pixels 20 are shown in the drawing. These four pixels 20 are arranged in a column, such that each pixel 20 is associated with a given row. This set of four pixels 20 comprises a sensor array unit cell. Each pixel comprises a photodetector 170, and a transfer gate 180. The floating diffusion 190, reset transistor 200 with a reset gate 210, source follower input transistor 220, row select transistor 230, and output signal line 240 are shared between the four pixels. A plurality of unit cells comprises the sensor array. Other specific embodiments are possible and readily apparent to someone skilled in the art.

There are four TG signals and one RG signal associated with a single row select line. This will be referred to as a four-shared pixel. As a result of the four-shared pixel, four photodiodes share the same floating diffusion node. Since the color pattern within a column is alternating colors, (e.g. G,R or B,G), photoelectrons collected in the same color photodiode can be summed or binned on the common floating diffusion (FD) by transferring of charge from the appropriate sets of photodiodes onto the FD. This will increase the effective responsivity or sensitivity of the sensor since the number of electrons collected for any given light level or integration time will be doubled. In addition, for very low light conditions where color information is not absolutely necessary, all four photodiode signals can be binned onto the common FD, further increasing sensitivity.

Figure 8A:
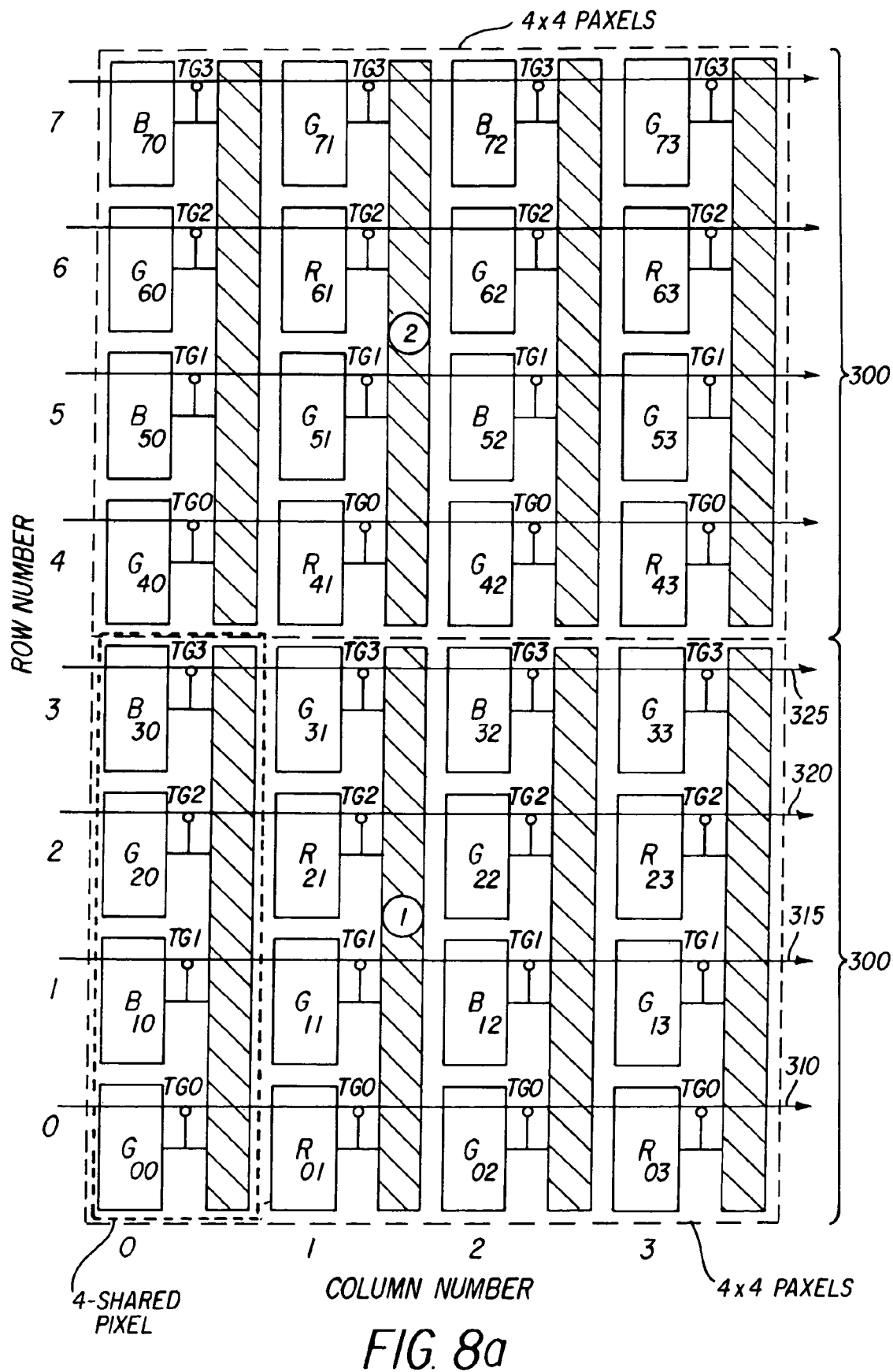
FIG. 8a is a block diagram of a first reduced resolution readout operation of the present invention.

In the first example a 16× resolution reduction of the full resolution image is accomplished. For example, a two megapixel sensor of 1632×1224 pixels would be reduced down to an image of 408×306. The resolution reduction is done by combining signals from a four pixel by four pixel area into a single new picture element referred to as a paxel 300. This paxel 300 is shown in FIG. 8*a*. Referring to FIGS. 2, 7, 8*a* and 8*c*, the rolling shutter start is applied to even and odd row pairs in the four rows of the paxel 300, so that the even and odd rows in the paxel 300 will have the same integration time. At the end of the desired integration readout begins for the even rows by reset of the FD 190 by pulsing RG 210 and storage of the reset level in the column sample and hold circuit 80, then pulsing TG 180 to transfer charge from the PD 170 to the FD 190 followed by storage of the signal+reset level in the column sample and hold circuit. This is done for row 0 and 2 simultaneously, (i.e. row select is on for the four-shared group, RG 210 is pulsed, reset level is sampled and held, TG0 (310) and TG2 (320) are pulsed simultaneously, this signal level is then sampled and held). At this point we have the two Green pixels binned on the floating diffusion of the even columns, and the two Red pixels binned on the floating diffusion 190 of the odd columns. This is denoted in FIG. 8*c* as the sum of two pixel values located in the respective column sample and hold circuit 150. The Green signals will be pipelined through one ASP channel, and the Red signals will be pipelined through the other ASP channel, as described in the dual channel architecture operation.

Now a key advantage of the dual channel architecture column can be employed. Because the signals stored in the respective ASP channels are the same color, adjacent signal samples can be directly and simply averaged in a pipelined manner to create a single value from the two adjacent color values in the 4×4 paxel. For example, after the ADC's 120 the two adjacent samples of each color, (2-Gr's and 2-R's), are averaged digitally and output as a single 10 bit R value and Gr value. This is shown in FIG. 8*c*. In this case the R and Gr value are actually derived from four individual pixels, two pixels binned in the charge domain and two binned values averaged in the digital domain. Thus sensitivity is increased and noise is reduced.

Next the odd rows in the paxel 300 are read out in a similar manner, (same as even rows except TG1 315 and TG3 325 are pulsed simultaneously). The Blue pixels are binned in the even columns and the Gb pixels are binned in the odd columns. The Gb values are sampled and held and then pipelined through the same channel as Gr, while the Blue values are sampled and held and then pipelined through the same channel as the Red pixels. The two adjacent values of B and Gb can now be digitally averaged, and single 10 bit values of B and Gb can be output from the sensor. The Gr and Gb values can be averaged off chip if desired to further reduce noise.

This approach has several advantages over the prior art sub-sampling method of APS devices. First, sensitivity is increased. Second, noise is reduced. This leads to a higher dynamic range. Additionally, aliasing artifacts caused by sub-sampling are not produced.

Figure 9:
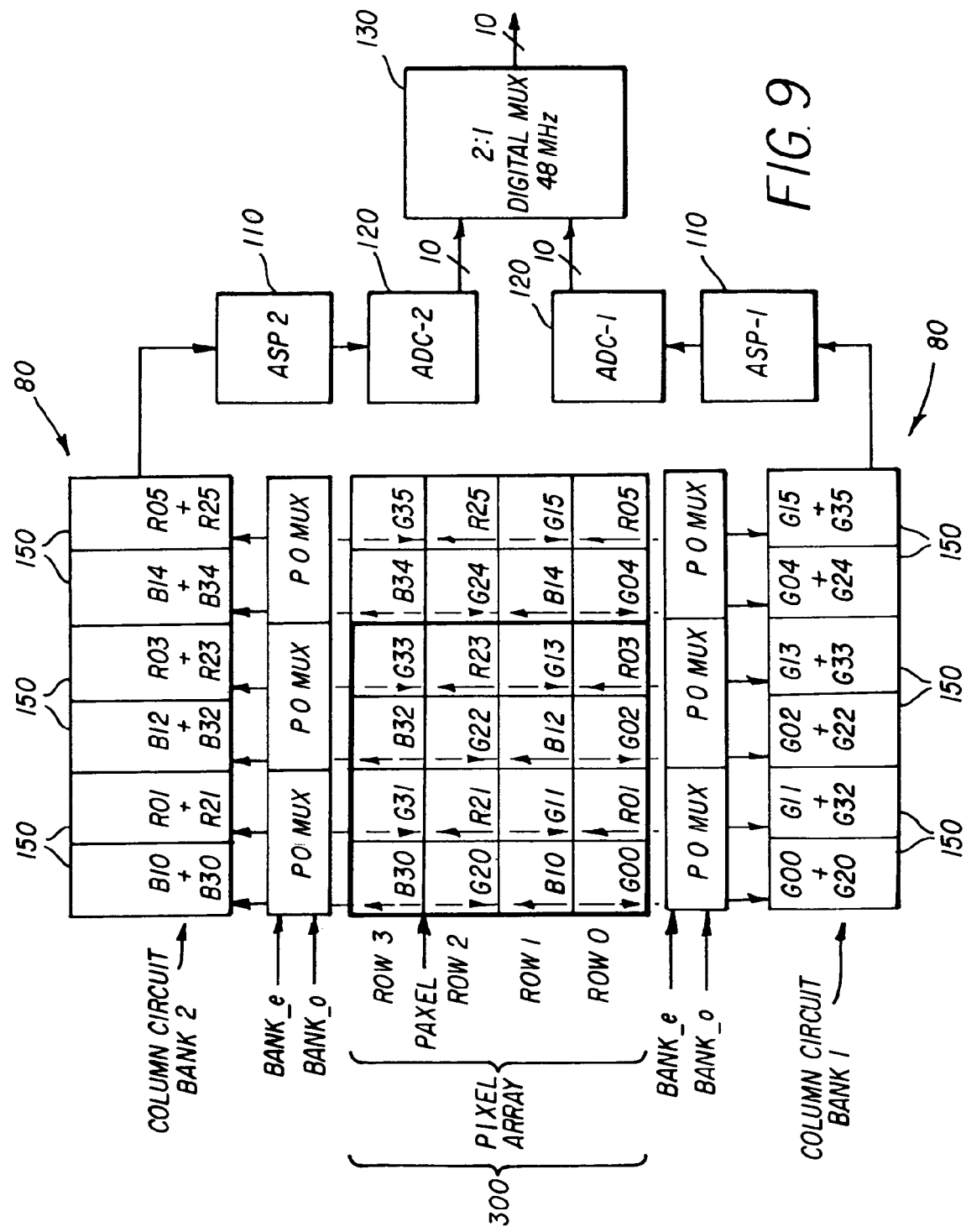
FIG. 9 is a block diagram of a first reduced resolution readout operation of the third embodiment of the present invention.

This same charge domain binning and voltage or digital domain adjacent sample averaging can be utilized with the sensor architecture of FIGS. 5*a* and 5*b*. The sensor architectures of FIGS. 5*a* and 5*b* provide an additional capability over that already described. Because the column sample and hold circuits 150 provided at the pixel pitch, the two channel architecture can effectively store two rows of image data simultaneously. By timing the pixel output multiplexer two rows of sensor data can be stored with the color planes separated for efficient adjacent sample averaging. Referring to FIGS. 5*a*, 7, and 6*e*, it follows that R', B', Gr' and Gb' pixel values can be stored in the column circuit banks 80 as shown in FIG. 9, where R', B', Gr' and Gb' are the charge domain binned values for the paxel. These are denoted in FIG. 9 as the sum of two pixel values shown in each column circuit 150 location. Gr' and Gb' are stored in Bank 1 (80), and R' and B' are stored in bank 2 (80) as previously described. Now adjacent values of each color can be averaged in a pipelined manner as the sensor is read out.

Additionally, since all color values are now available at the same time, no interpolation is required to get an RGB value per 4×4 paxel. The RGB per paxel 300 can also be easily converted selectively to YUV or YCC on chip in the digital domain. White balance and color correction could also be done simply for each paxel digitally. This is an advantage for direct output video for camera preview modes and other video modes.

Figure 8B:
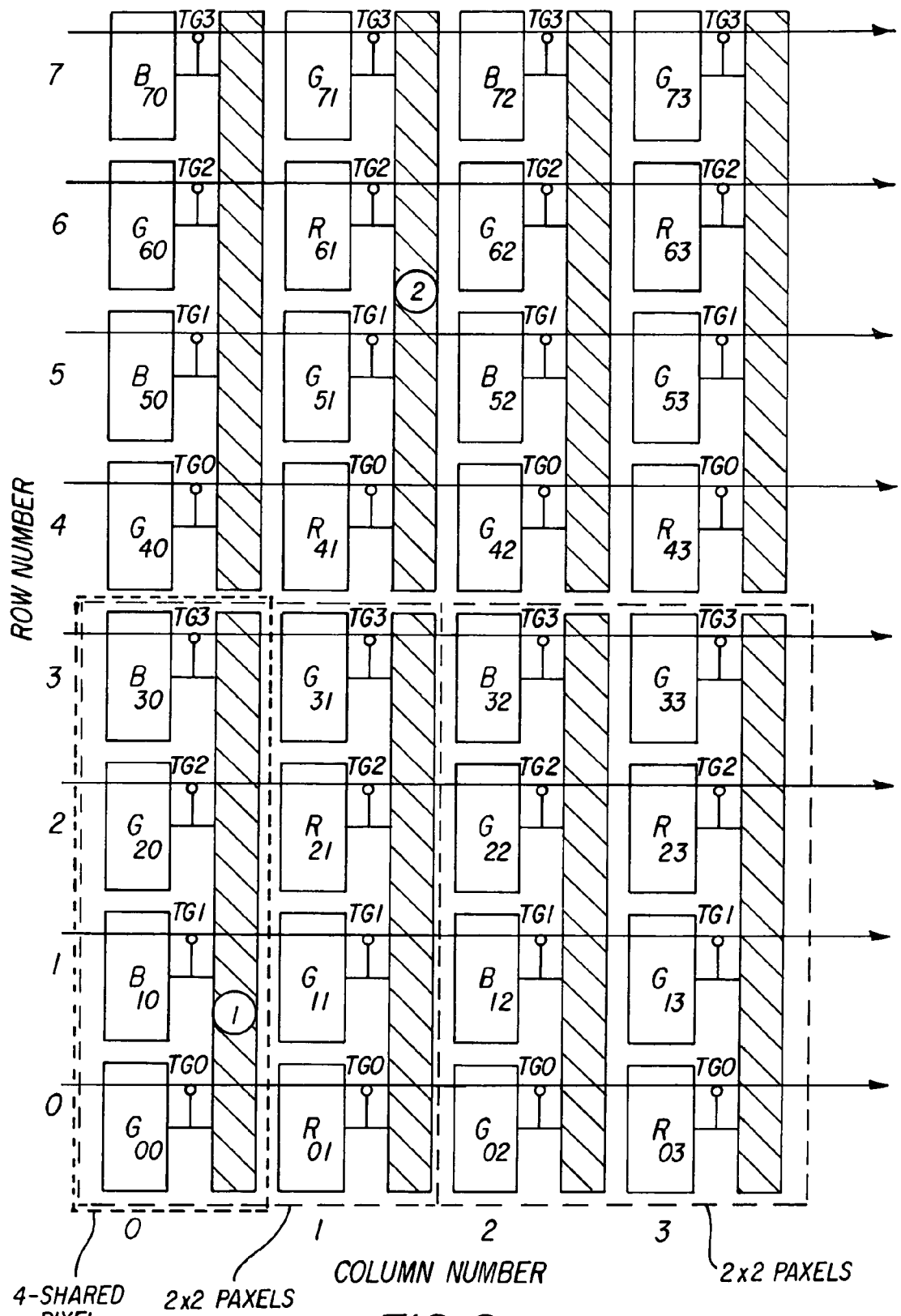
FIG. 8b is a block diagram of a second reduced resolution readout operation of the present invention.
Figure 8C:
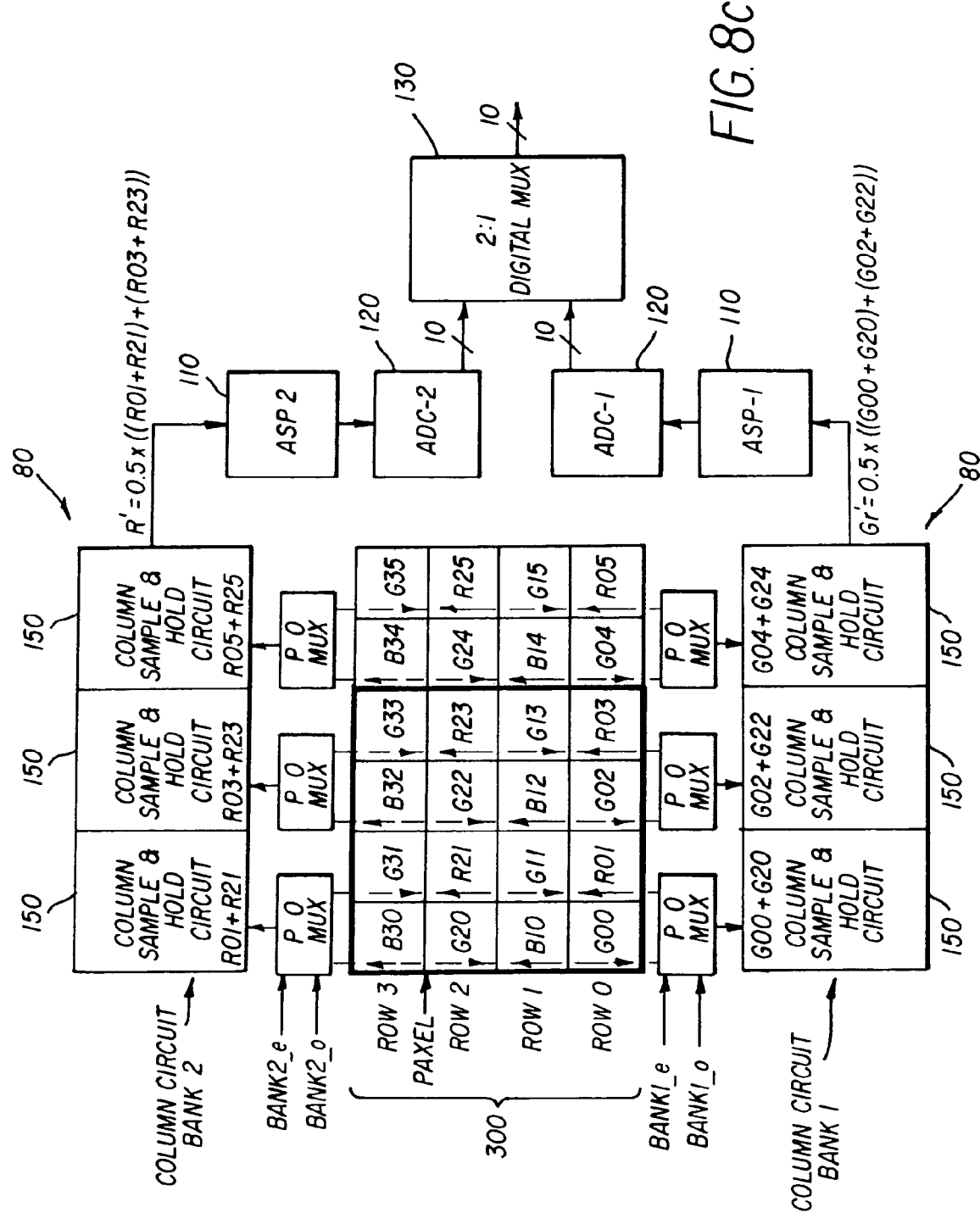
FIG. 8c is an operational block diagram of reduced resolution readout operation of the present invention.
Figure 10:
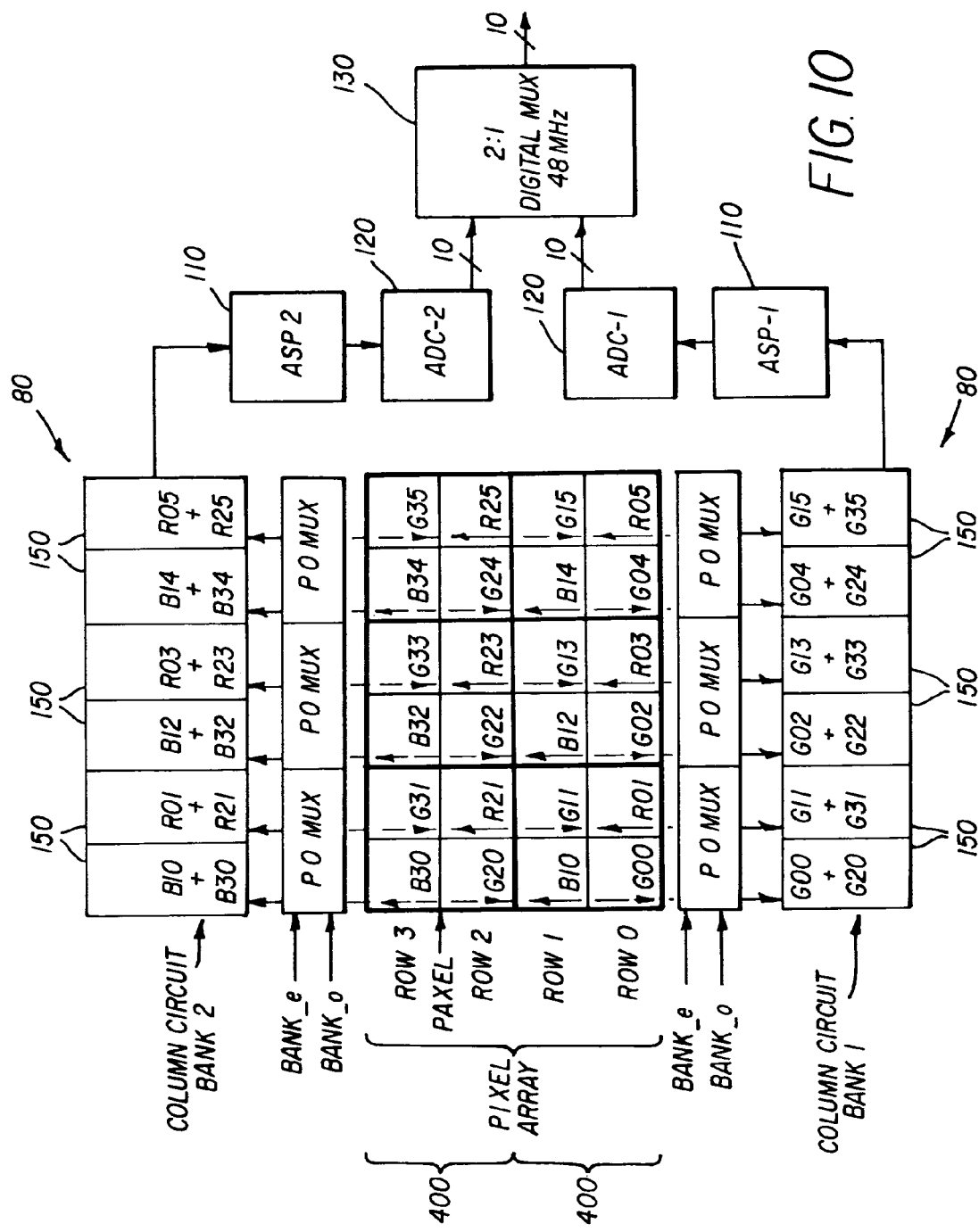
FIG. 10 is a block diagram of a second reduced resolution readout operation of the third embodiment of the present invention.

Referring to FIGS. 10 and 8*b*, a 4× reduction in resolution can be accomplished. B10 and R01 become the B and R values for paxel 400 respectively, and the average of G00 and G11 become the G value for paxel 400. The readout is done in the same manner as full resolution mode, (for row 0, Gr is readout out through 1 ASP chain 110, R is readout through the other; for row 1, Gb is readout through 1 ASP chain and B is readout through the other). G channel averaging is done in the DSP block 140.

Figure 11:
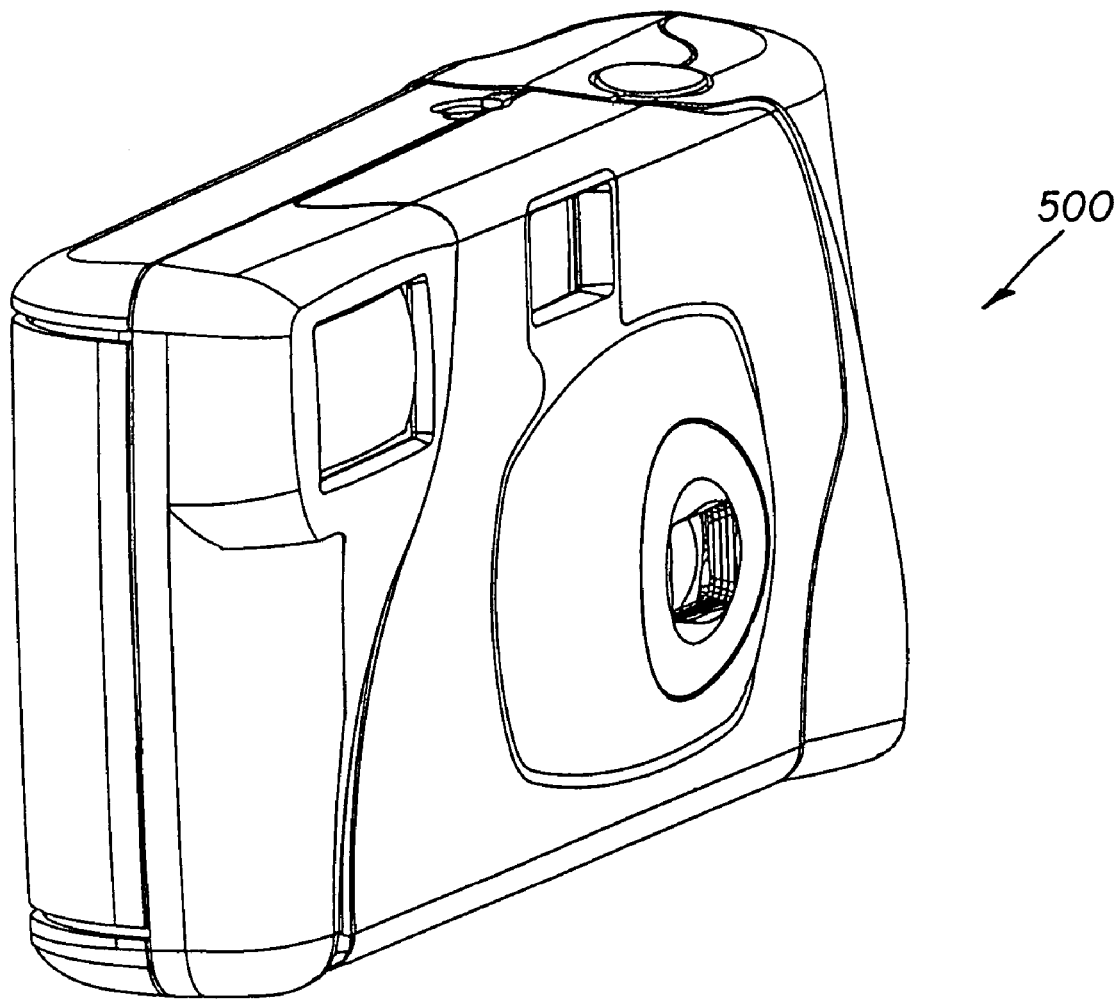
FIG. 11 is a camera for implementing all of the disclosed embodiments of the present invention.

FIG. 11 is a camera 500 for implementing all of the disclosed embodiments of the present invention.

The foregoing discussion describes the embodiments most preferred by the inventor. Numerous variations will be readily apparent to those skilled in the relevant art. Therefore, the scope of the invention should be measured not by the disclosed embodiments but by the appended claims.

The invention has been described with reference to a preferred embodiment. However, it will be appreciated that variations and modifications can be effected by a person of ordinary skill in the art without departing from the scope of the invention.

PARTS LIST 10 image sensor (or sensor array)
20 pixels
80 column circuit banks (or storage regions)
90 output signal lines
110 analog signal processing (ASP) chains (or readout regions)
120 analog to digital converter (ADC)
130 2:1 digital multiplexer/pixel output multiplexer
140 digital signal processing (DSP) block
150 column sample and hold circuits
160 two-to-one pixel output analog multiplexer
170 photodiode/photodetector
180 transfer gate
190 floating diffusion
200 reset transistor
210 reset gate
220 source following input transistor
230 row select transistor
240 output signal line
300 paxel
310 TG0
315 TG1
320 TG2

325 TG3
400 paxel

What is claimed is:

1. An x-y addressable image sensor comprising:
   (a) a plurality of light receiving elements arranged in an array of rows and columns that convert the light to a signal;
   (b) means for reading out two or more equivalent samples of a same signal from each light receiving element in at least one row, wherein the same signal is produced after a single integration period for all of the light receiving elements in the at least one row;
   (c) at least two signal storage banks comprised of individual signal storage elements; each of the at least two storage banks having enough individual storage elements to store the two or more signals from the at least one row of light receiving elements in the array, wherein the two or more samples of the same signal are concurrently stored in different individual signal storage elements; and
   (d) at least two select mechanisms which can direct signals from the plurality of light receiving elements to any single or combination of the signal storage banks.

2. The image sensor as in claim 1 further comprising a plurality of color filters mated with the plurality of light receiving elements, and the select mechanism is used to send signals from the light receiving elements mated to a single color filter type to a desired signal storage bank such that, for any given row, a single signal storage bank contains signals from a single color type.

3. The image sensor as in claim 2 wherein the color filter is a Bayer pattern in which signals from a single color type are sent to only one of the two signal storage banks.

4. The image sensor as in claim 3, wherein the single color type sent to only one of the storage regions is green.

5. The image sensor as in claim 1, wherein the individual signal storage elements in the signal storage banks are larger than light measuring element pitch.

6. The image sensor as in claim 1, wherein the at least two select mechanisms direct signals from the each of the plurality of light receiving elements to both signal storage banks.

7. The image sensor as in claim 1 further comprising a plurality of signal storage banks and the at least two select mechanisms direct signals to multiple signal storage banks.

8. The image sensor as in claim 1, wherein a single pixel can be directed to multiple single storage elements within any signal storage bank.

9. The image sensor of claim 8, wherein adjacent signals from the light receiving elements in the adjacent signal storage elements are averaged to produce a single value.

10. The image sensor as in claim 1, wherein a single pixel can be directed to adjacent individual signal storage elements within any signal storage bank.

11. The image sensor of claim 10, wherein adjacent signals from the light receiving elements in the adjacent signal storage elements are averaged to produce a single value.

12. A camera comprising:
   an x-y addressable image sensor comprising:
   (a) a plurality of light receiving elements arranged in an array of rows and columns that convert the light to a signal;
   (b) means for reading out two or more equivalent samples of a same signal from each light receiving element in at least one row, wherein the same signal is produced after a single integration period for all of the light receiving elements in the at least one row;
   (c) at least two signal storage banks comprised of individual signal storage elements; each of the at least two storage banks having enough individual storage elements to store the two or more signals from the at least one row of light receiving elements in the array, wherein the two or more samples of the same signal are concurrently stored in different individual signal storage elements; and
   (d) at least two select mechanisms which can direct signals from the plurality of light receiving elements to any single or combination of the signal storage banks.

13. The camera as in claim 12 further comprising a plurality of color filters mated with the plurality of light receiving elements, and the select mechanism is used to send signals from the light receiving elements mated to a single color filter type to a desired signal storage bank such that, for any given row, a single signal storage bank contains signals from a single color type.

14. The camera as in claim 13 wherein the color filter is a Bayer pattern in which signals from a single color type are sent to only one of the two signal storage banks.

15. The camera as in claim 14, wherein the single color type sent to only one of the storage regions is green.

16. The camera as in claim 12, wherein the individual signal storage elements in the signal storage banks are larger than light measuring element pitch.

17. The camera as in claim 12, wherein the at least two select mechanisms direct signals from the each of the plurality of light receiving elements to both signal storage banks.

18. The camera as in claim 12 further comprising a plurality of signal storage banks and the at least two select mechanisms direct signals to multiple signal storage banks.

19. The camera as in claim 12, wherein a single pixel can be directed to multiple single storage elements within any signal storage bank.

20. The camera as in claim 19, wherein adjacent signals from the light receiving elements in the adjacent signal storage elements are averaged to produce a single value.

21. The camera as in claim 12, wherein a single pixel can be directed to adjacent individual signal storage elements within any signal storage bank.

22. The camera as in claim 21, wherein adjacent signals from the light receiving elements in the adjacent signal storage elements are averaged to produce a single value.

23. A method for operating an x-y addressable image sensor that includes at least two storage banks comprised of individual storage elements each of the at least two storage banks having enough individual storage elements to store signals from at least one row of light receiving elements, the method comprising:
   capturing a single image using a single integration period for all of the light receiving elements in at least one row;
   after the single integration period, reading out two or more equivalent samples of the same signal for each light receiving element in the at least one row;
   storing the two or more samples of the same signal in respective storage elements in the at least two storage banks.

24. The method as in claim 23, further comprising:
   for each light receiving element in the at least one row, reading out the two or more samples of the same signal from the respective storage elements; and
   averaging the two or more samples to generate a single average signal.

* * * * *